United States Patent
Lehman et al.

[11] Patent Number: 6,095,697
[45] Date of Patent: Aug. 1, 2000

[54] CHIP-TO-INTERFACE ALIGNMENT

[75] Inventors: John A. Lehman, St. Paul; Patrick M. Hamilton, Golden Valley, both of Minn.

[73] Assignee: Honeywell International Inc., Morristown, N.J.

[21] Appl. No.: 09/052,643

[22] Filed: Mar. 31, 1998

[51] Int. Cl.[7] .................... G02B 6/36; G02B 6/42
[52] U.S. Cl. ................... 385/88; 385/90; 385/91
[58] Field of Search .................. 385/31, 49, 51, 385/88–93

[56] References Cited

U.S. PATENT DOCUMENTS

| | | | |
|---|---|---|---|
| 5,375,184 | 12/1994 | Sullivan | 385/129 |
| 5,414,787 | 5/1995 | Kurata | 385/92 |
| 5,535,296 | 7/1996 | Uchida | 385/89 |
| 5,881,190 | 3/1999 | Harpin et al. | 385/49 |

FOREIGN PATENT DOCUMENTS

| | | | |
|---|---|---|---|
| 0223414 | 5/1987 | European Pat. Off. | H01S 3/02 |
| 0635741 | 1/1995 | European Pat. Off. | G02B 6/42 |
| 19610881 | 6/1997 | Germany | G02B 7/00 |
| 19644758 | 4/1998 | Germany | G12B 5/00 |
| 9415235 | 7/1994 | WIPO | G02B 6/42 |

*Primary Examiner*—Rodney Bovernick
*Assistant Examiner*—Juliana K. Kang
*Attorney, Agent, or Firm*—John G. Shudy, Jr.

[57] ABSTRACT

A rigid alignment of a fixture connection to a chip having the rigidity of the connection transferred from the chip to a chip holder. The chip has an alignment feature that has a specific position relative to a device on the chip to which another device of a fixture is to be aligned. An alignment fixture has an alignment feature and a device site which aligns with the alignment feature and the device on the chip, respectively. The alignment fixture has a fastener on the chip holder. The chip is moveable on the holder and is moved until the alignment features of the fixture are aligned, which also results in the alignment of the device site with the device. The chip is attached with glue or solder to the holder. The alignment fixture is removed and substituted with a connector interface fixture having no alignment feature relative to the chip but rather an alignment mechanism to the block that the chip is attached. The device and a fastener of the connector interface fixture have the same relative positions as the device site and fastener, respectively, of the alignment fixture. Attaching the fastener of the device fixture to the fastener on the chip holder results in passive alignment of the devices on the fixture and the chip, as the fasteners are likened to an alignment mechanism or features. Stresses applied to the device fixture are transferred to the chip holder via the fastener, and not to the chip.

26 Claims, 5 Drawing Sheets

6,095,697

CHIP-TO-INTERFACE ALIGNMENT

The Government may have rights in this invention pursuant to Contract No. DAAL01-94-C-3426 awarded by the Department of the Army.

BACKGROUND

The present invention pertains to optoelectronic packages and particularly to packaging of devices for coupling light from an optical waveguide or optical device on a board or substrate to an optical port on an integrated circuit. More particularly, this invention pertains to the use of self-aligned, flexible or rigid optical waveguides or fixtures that hold waveguides, lenses or fibers, for coupling light between an optoelectronic device and an optical fiber, waveguide or lens, or arrays of devices, lenses, fibers and/or waveguides.

U.S. Pat. No. 5,375,184 ('184 patent) by inventor Charles T. Sullivan and issued Dec. 20, 1994, which is hereby incorporated by reference in this specification and discloses a self-aligning mechanical approach for lateral waveguide to lateral waveguide alignment and the use of visual alignment marks for lateral waveguide to lateral waveguide alignment or the alignment of a vertical port to a waveguide with a 45 degree facet. The visual alignment marks of the '184 patent for use with a vertically coupled optical port still require manual alignment which is not self-aligning.

Coupling light from an optical waveguide on a planar printed circuit board or chip substrate via a mount to an optical port on an electronic, opto-electronic or photonic integrated circuit is very difficult to achieve, in the related art, if such coupling is to have high throughput efficiency, tolerance to variations in temperature and wavelength, robustness, and low assembly and maintenance cost.

SUMMARY OF THE INVENTION

The present invention provides a method and mechanism for rigid alignment of a fixture, which may hold an optical waveguide fiber, fiber array, lens or lens array, to a light emitting source or laser array chip, or to a photodetector element or photodetector array chip. A photopolymer film (e.g., Riston) is laminated onto a wafer containing the laser devices or photodetector devices. Once the film is laminated on to the wafer, it is exposed using an appropriate mask and then developed to create the polymer mechanized features. A fiber holder is fashioned to mate with the polymer features. The fibers or lenses for waveguides or lens arrays are positioned within the holder such that when the holder is mated with the laser or photodetector chip, the fibers, waveguides or lenses are passively aligned to the active elements of the devices. "Passively aligned" means that the device does not have to be powered up for alignment.

An advantage of the present invention over the known prior art is that the features for all the chips are created at the same time at the wafer level which results in reduced costs. These chip features are used by a fiber, waveguide or lens holder to passively align to the optimum position to maximize optical coupling in and out of the fiber, lens or waveguide. Other advantages, particularly relative to VCSEL'S, include good coupling efficiencies of VCSEL power into the fiber, lens or waveguide, direct attachment of VCSEL chips to a circuit board without the need of a special header, elimination of the need to power-on to perform the alignment, and the lack of need to polish fibers at an angle which is required for many array/fiber interfaces. The present approach can be implemented at both the detector and source ends of an optical link, and thus result in fewer parts.

DESCRIPTION OF THE EMBODIMENTS

Figure 1A:
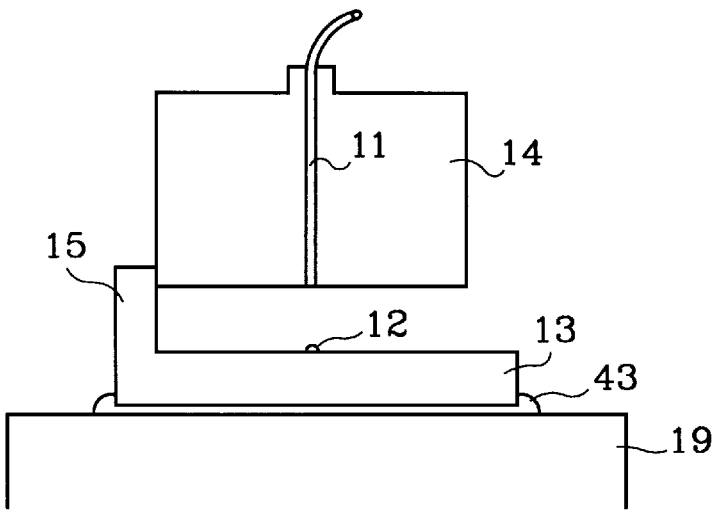
FIGS. 1a, 1b and 1c show various alignments and securing of an optical waveguide connector or holder to an optical device and the respective chip.
Figure 1B:
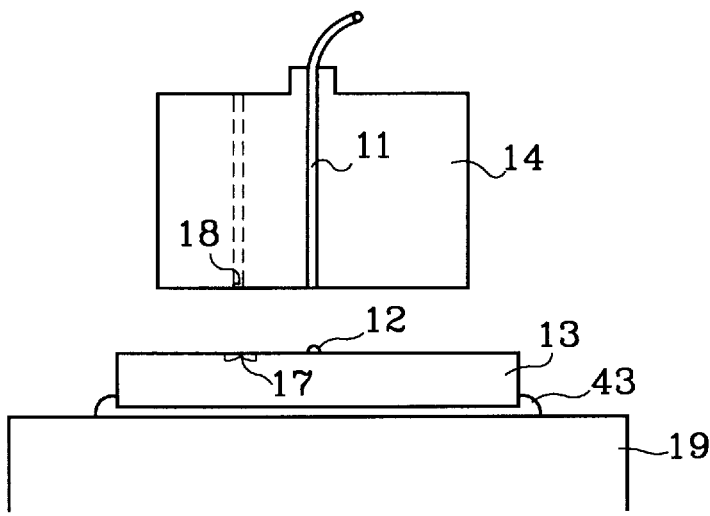
Figure 1C:
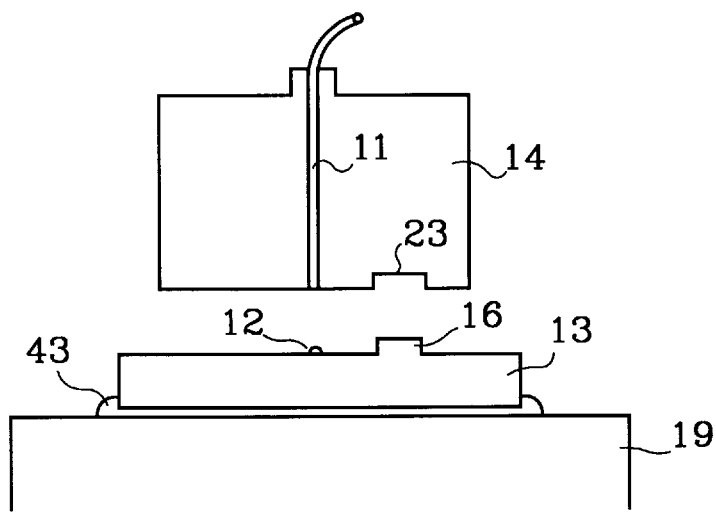
Figure 2A:
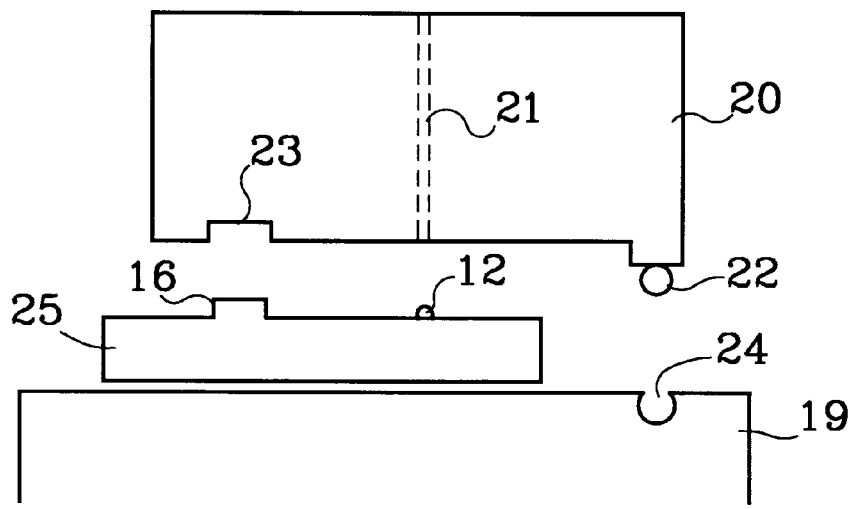
FIGS. 2a and 2b show a key-type alignment of an optical waveguide which is secured to a chip holder.
Figure 2B:
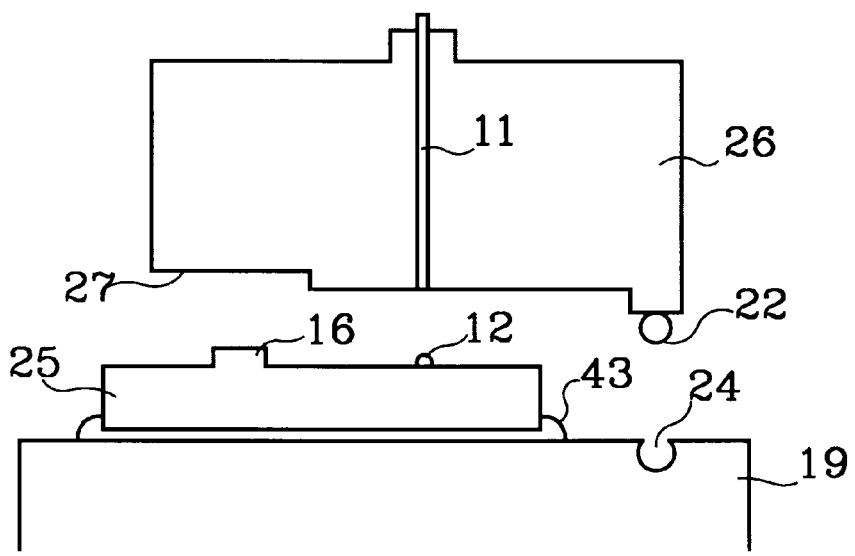

FIGS. 1a, 1b and 1c show related art approaches to the alignment of optical waveguide, fibers or fiber connector 11 with a device or devices 12 on a chip 13. Chip 13 is adhered to chip holder 19 with some adhesive such as solder or glue 43. A header 14, for example, that holds fiber or fibers 11, is aligned with device 12 by a guide 15, a key 16 with slot 23, or registration mark 17 on chip 13, with site 18. In the case of a registration mark being aligned to a mark or site 18 on header 14, header 14 would need to be secured to chip 13 to maintain the proper alignment between waveguide, fiber or fibers 11 with device or devices 12. Guide 15 or key 16 could maintain such alignment between one or more optical waveguides 11 and one or more devices 12. Chip 13 may or may not be securely attached to mount or holder 19. This alignment to chip 13 is difficult in terms of making the guide 15, key 16 or registration mark(s) 17 to be aligned so that the critical alignment between device 12 and waveguide 11 has the maintained accuracy. Such alignment is not rigid because chip 13 is fragile, and harsh movement of header 14 relative to chip 13, may break or dislodge guide 15 or key 16, or the connection or adhesion that maintains alignment of registration mark 17 and site 18. Also, chip 13 may be easily shifted or detached from holder 19, as all of the force or disturbance of header 14 would be transferred to chip 13.

FIGS. 2a, 2b, 3a and 3b illustrate the approach of the present invention that achieves accurate and rigid alignment between the fiber(s) or waveguide(s) 11 and device(s) 12 on integrated circuit or chip 25, 28 with excellent shear strength. A master or dummy connector, ferrule or header 20 has an alignment tube(s), notch(es), site(s) or mark(s) 21 in place of waveguide(s) 11 which is aligned with device(s) 12 on chip 25, 28. Dummy or master header 20 has a slot 23 which is situated and formed, perhaps with a mask, at a particular location or distance from alignment tube, notch, site or mark 21. A polymer or Riston key or other raised area is applied to chip 25, with perhaps the same dimensioned mask as used for making slot 23 on dumm header 20. The key or raised area has the same dimensions as slot 23 or relies on one of the edges of key 16, and is positioned with a location and distance from device 12 that are the same as the location and distance of slot 23 from tube, notch, site or mark 21 on header 20. When header 20 is brought up next to chip 25 such that key 16 fits into slot 23, then device 12 will be aligned with site or mark 21. At this point of alignment, chip 25 is not fixed and is moveable relative to the surface of holder, board, or substrate 19. Header 20 has a ball 22 and a socket 24 for a secure connection when ball 22 is inserted in socket 24. There may be two ball and socket connections. This connection positions header 20 relative to holder 19. At the same time, chip 25 is moved to line up with header 20 and thus positioned relative to holder 19. At this location, chip 25 is fixed to holder 19 with solder or glue 43. After the adhesive, glue or solder is cured, providing a bond of chip 25 to holder 19, header 20 and ball 22 are removed from chip 25 and socket 24, respectively. In place of header 20 is a header or connector 26 of FIG. 2b which is situated having optical waveguide 11 that has a position and distance from ball 22 that is the same as that of site 21 and ball 22 of header 20. Header 26 is brought next to chip 25 which is the same chip and holder of FIG. 2a. A space, clearing or enlarged slot 27 is provided on connector or header 26 so that key 16 does not restrict or interfere with the movement of header 26 relative to chip 25. Ball 22 is slipped into socket 24 providing a secure connection of header 26 relative to holder 19. Since chip 25 is aligned with dummy header 20 and socket 24, and secured firmly to board or holder 19 with an adhesive such as solder or glue 43, then waveguide 11 will be aligned with device 12. Sheer stress or movement of header 26 will not affect chip 25 because such movement and stress will be abated by holder 19 via the ball 22 and socket 24 connection to header 26.

Figure 3A:
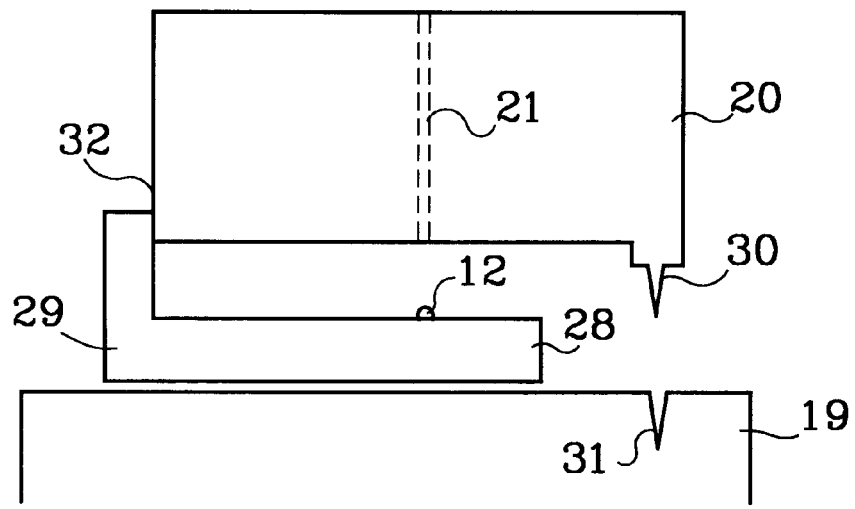
FIGS. 3a and 3b show a bar-stop alignment of an optical waveguide which is secured to a chip holder.
Figure 3B:
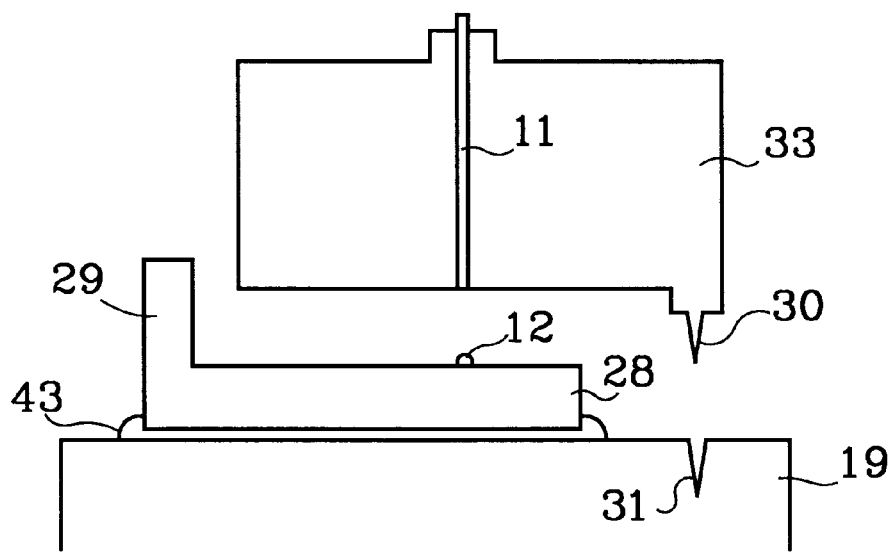

Variants of this secure alignment exist and several examples are shown in FIGS. 3a and 3b. FIG. 3a shows a chip 28 having device 12 and an alignment bar 29, loosely situated but not fixed on chip holder 19. Dummy or master header 20 has alignment tube, site or mark 21 like that in FIG. 2a, in place of optical waveguide or array 11. Header or connector 20 has a spike or screw 30 that fits snuggly into receptacle 31, and thus secures header 20 in one position relative to holder 19. There may be two of these connections. The chip 28 is moved and situated so that alignment bar 29 is butted up against an edge 32 of header 20. The position and distance of that edge 32 from site or mark 21 is the same as the inside edge of alignment bar 29 is from device 12 on chip 28; so that when edge 32 and bar 29 are in contact, then site or mark 21 is aligned with device 12. At this point, chip 28 is glued or soldered with material 43, to holder 19 to hold it fixed in that aligned position. In FIG. 3b, dummy header 20 is replaced by header or connector 33 having optical waveguide or array 11 in place of site or mark 21. The position and distance of pin or screw 30 relative to site or mark 21 in header 20 is the same as that of pin or screw 30 relative to site or mark 21 of header 33. The edge of header 33 proximate to alignment 29 is at a distance so that neither item touches or interferes with the other when header 33 is mounted on chip 28 which is fixed to board or holder 19. Because of the alignment and the fixing of chip 28 in FIG. 3a, optical waveguide or array 11 will align with device 12 when pin or screw 30 is inserted into receptacle 31.

Alignments of dummy or master header 20 with chip 25 or 28 may be effected with registration marks on the chip and/or header prior to the gluing or soldering 43 of the chip to chip holder 19. Alignment of the site 21 with device 12 may actually be done visually or directly with site 21 to device 12. Other kinds of alignment of header 20 to chip 28 may be used. Besides, ball 22 and socket 24, pin or screw 30 and hole 31 for securing header 26 or 33 to chip holder 19, other kinds of means of securing connector or header 20, 26, or 33 to holder 19 may be used.

Figure 4A:
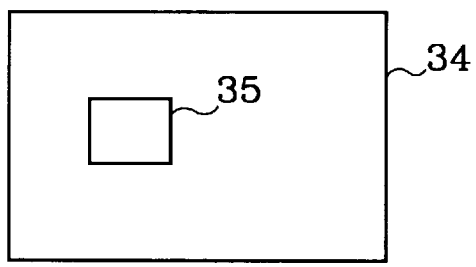
FIGS. 4a, 4b, 4c and 4d show various alignment features for chip alignment to a dummy header.

FIG. 4a is a top view of a chip 34 which has a square alignment key 35 for a master or dummy header or connector alignment. Key 35 projects above the surface of chip 34 and fits against a corner of a square slot on the master or dummy header for two-dimensional alignment. The key and corresponding slot or hole may have various kinds of shapes. The hole or slot instead may be in the chip and the projecting key be situated in the master or dummy header or connector.

Figure 4B:
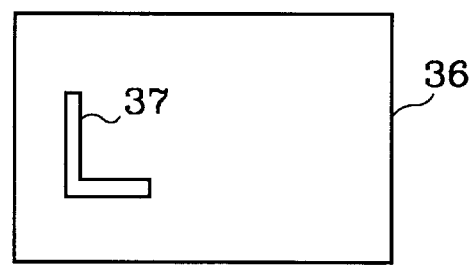

FIG. 4b is a top view of a chip 36 which has a right-angled alignment bar 37 protruding from chip 36. Master and dummy header can be butted into the corner of bar 37 for two-dimensional rigidity.

Figure 4C:
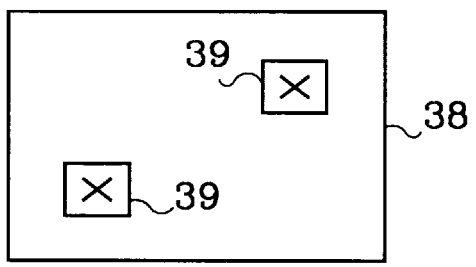
Figure 4D:
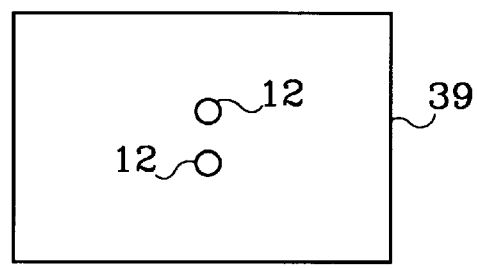

FIG. 4c shows a top view of chip 38 having registration marks 39 upon which a master or dummy header or connector can be aligned visually. Site 21 of a dummy or master header or connector may be directly aligned to devices 12 of FIG. 4d.

Figure 5:
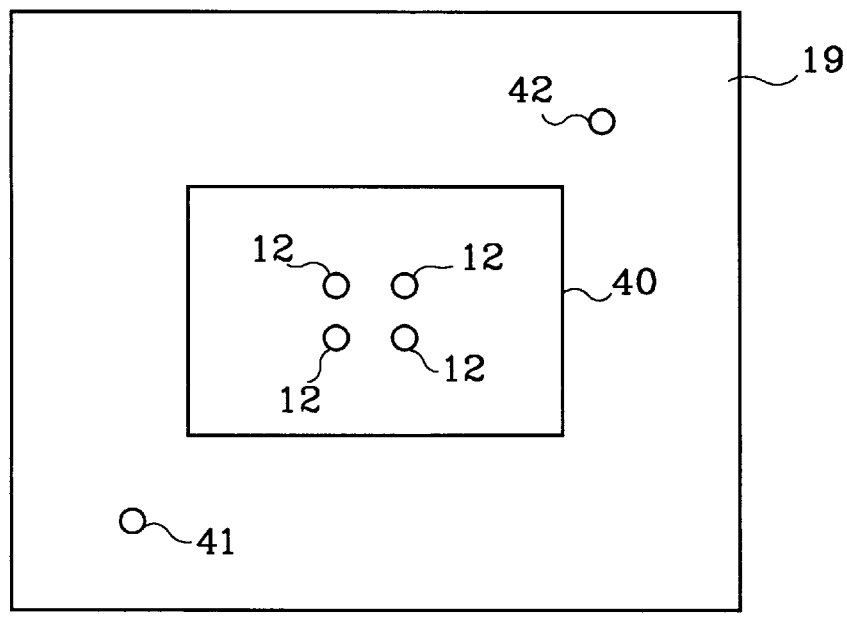
FIG. 5 shows example locations of securing devices for securing an optical waveguide header to a chip holder that has the optical device to which the waveguide is aligned.

FIG. 5 is a top view of chip holder 19 and chip 40 having an array of optical devices 12. Optical devices 12 may be detectors, light emitting diodes, vertical cavity surface emitting lasers (VCSEL's) or optical waveguides. This figure illustrates an example location of securing devices 41 and 42 for securing header or connector 26 or 33, for instance, to chip holder 19. The securing devices may be sockets, pin holes, and other kinds of fasteners. The number and layout of the securing devices on holder 19, along with companion devices on the corresponding header, may vary from situation to situation.

Figure 6:
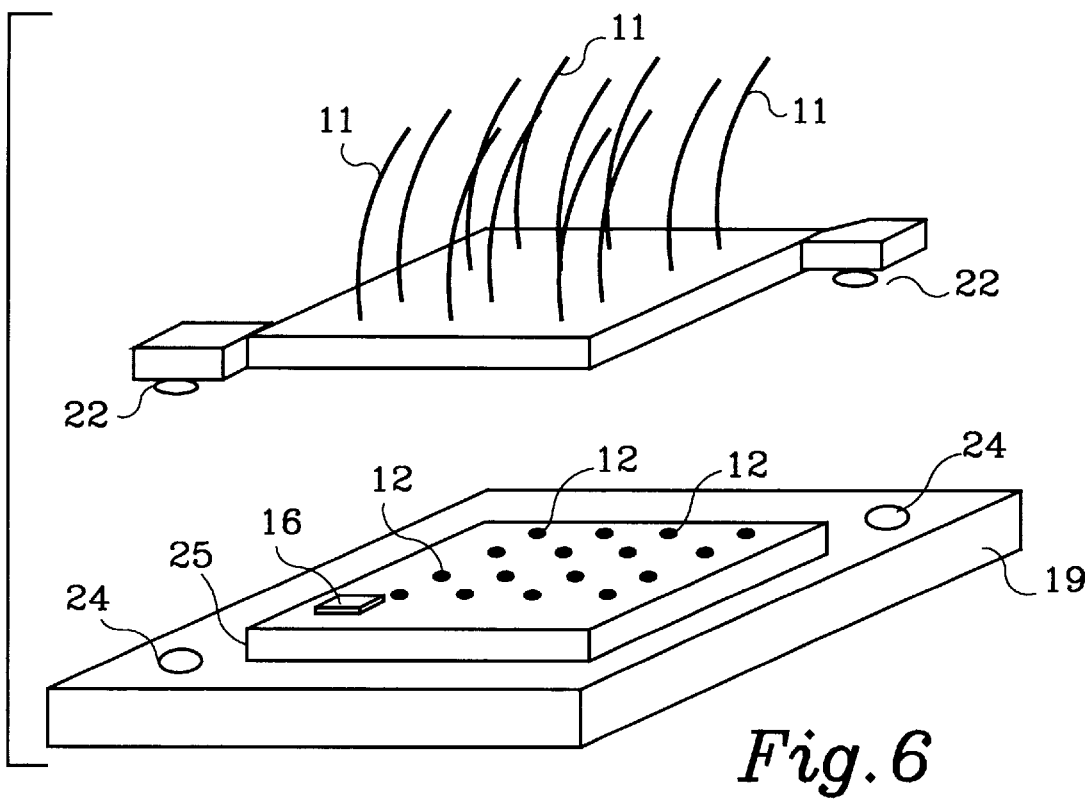
FIG. 6 illustrates the application of the invention to linear and two-dimensional arrays of devices.
Figure 7:
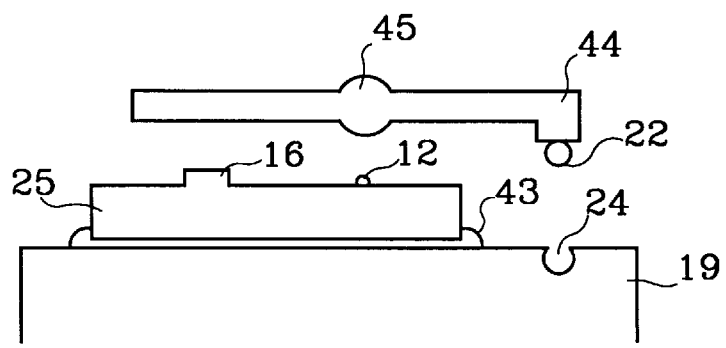
FIG. 7 shows application of the invention to a lens or a lens array.

The rigid interface-to-chip alignment can be extended to a linear or two-dimensional array of connections 11 and 12 (e.g., fibers, lens, detectors or sources) as illustrated in FIG. 6. Another approach is where the function (component) of the fiber/waveguide (item 11 in FIGS. 2b and 3b) is replaced by a lens or lens array 45, as shown in FIG. 7. The alignment at block 44 to holder 19 is made in the same way as in FIGS. 2a, 2b, 3a and 3b.

What is claimed is:

1. A method for alignment of a device to a chip, comprising:

forming a first alignment mark on a chip having an optical device fixed at a first location relative to the first alignment mark;

placing the chip on a holder, the chip being moveable relative to the holder and the holder having a first fastener;

placing a first optical connector proximate to the chip, the first optical connector having an optical interface, a second alignment mark having a second location relative to the optical interface, the second location being the same as the first location in that alignment of the second alignment mark with the first alignment mark results in alignment of the optical interface with the optical device, and the first optical connector having a second fastener;

moving the first optical connector and the chip in concert to connect the second fastener to the first fastener so that the first optical connector is fixed in position relative to the holder;

applying an adhesive to the chip and to the holder to place the chip in a fixed position relative to the holder;

disconnecting the second fastener from the first fastener;

removing the first optical connector away from the chip and the holder; and placing a second optical connector proximate to the chip and the holder, the second optical connector comprising an optical interface and a second fastener that have a relative location to each other that is the same as a relative location between the optical interface and the second fastener of the first optical connector.

2. The method of claim 1, further comprising connecting the second fastener of the second optical connector to the first fastener so that the second optical connector is fixed in location relative to the holder.

3. The method of claim 2, wherein the optical interface of the second optical connector is aligned with the optical device.

4. The method of claim 3, wherein an alignment between the optical interface of the second optical connector and the optical device is maintained by a connection between the second fastener of the second optical connector and the first fastener.

5. The method of claim 4 wherein:
the first alignment mark is a key; and
the second alignment mark is a slot.

6. The method of claim 4 wherein:
the first alignment mark is a bar; and
the second alignment mark is an edge of the first optical connector.

7. The method of claim 4, wherein the adhesive is a solder.

8. The method of claim 4, wherein the adhesive is a mechanical connection.

9. The method of claim 4, wherein the adhesive is a glue.

10. The method of claim 4, wherein the optical interface of the second optical connector is at least one optical waveguide.

11. The method of claim 10, wherein the at least one optical waveguide is at least one optical fiber.

12. The method of claim 4, wherein the optical device is at least one detector.

13. The method of claim 4, wherein the optical device is at least one light source.

14. The method of claim 13, wherein the optical device is at least one VCSEL.

15. A method for aligning a first device with a second device, comprising:
forming a first alignment feature on a chip having the second device;
placing the chip on a holder, the chip being moveable relative to the holder and the holder having a first securing mechanism;
placing a first header proximate to the chip, wherein the first header has a second alignment feature and a second securing mechanism;
connecting the second securing mechanism to the first securing mechanism to secure the first header to the holder;
moving the chip on holder so as to align the first alignment feature with the second alignment feature;
securing the chip to the holder;
disconnecting the second securing mechanism from the first securing mechanism;
placing a second header proximate to the chip, wherein the second header has a third securing mechanism; and
connecting the third securing mechanism to the first securing mechanism, thereby resulting in an alignment of the first and second devices.

16. The method of claim 15, wherein the first and second alignment features are visual features.

17. The method of claim 15, wherein the first and second alignment features are physical features.

18. The method of claim 15, wherein the first device is at least one optical waveguide.

19. The method of claim 18, wherein the at least one optical waveguide is at least one optical fiber.

20. The method of claim 15, wherein the second device is at least one detector.

21. The method of claim 15, wherein the second device is at least one light source.

22. The method of claim 21, wherein the at least one light source is at least one VCSEL.

23. A method for aligning first and second devices, comprising:
forming a first alignment feature on a chip having the first device at a first location relative to the first alignment feature;
placing the chip on a holder having a first fastener, wherein the chip is moveable relative to the holder;
placing a first header, having a second fastener, a device site and a second alignment feature, on the chip and the holder, wherein the second alignment feature is at a second location relative to the device site, the second location being the same as the first location in that alignment of the second alignment feature with the first alignment feature results in alignment of the device site with the first device;
connecting the first and second fasteners together to prevent the first header and the holder from moving relative to each other;
moving the chip to align the first and second alignment features with each other, resulting in an alignment of the device site with the first device;
securing the chip to the holder to prevent the chip and the holder from moving relative to each other;
disconnecting the first and second fasteners from each other;
taking the first header away from the chip and the holder;
placing a second header on the chip and the holder, the second header having a second device and a third fastener which have a relative location to each other that is the same as a relative location between the device site and the second fastener on the first header; and
connecting the first and third fasteners together to result in an alignment of the first and second devices.

24. The method of claim 23, wherein the first device is at least one detector.

25. The method of claim 23, wherein the first device is at least one light source.

26. The method of claim 23, wherein the second device is at least one optical waveguide.

* * * * *